July 25, 1939.    N. ORGITANO    2,167,310
SHOE FINISHING MACHINE
Filed June 8, 1938    3 Sheets-Sheet 1
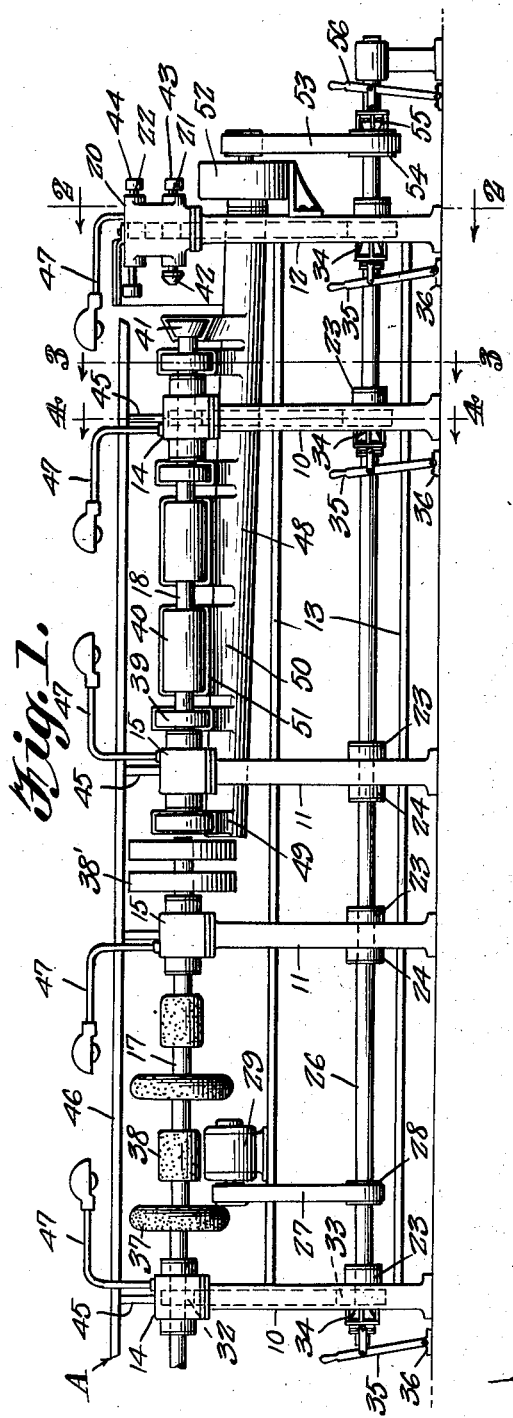
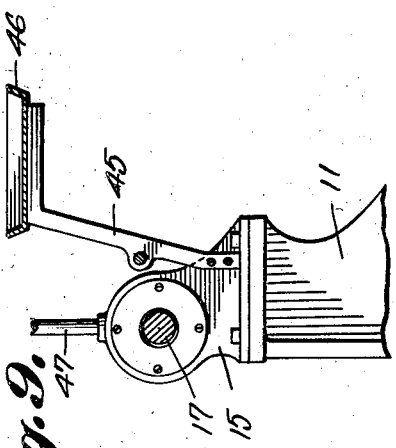
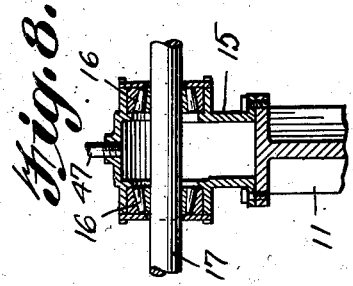
Nick Orgitano, INVENTOR July 25, 1939.  N. ORGITANO  2,167,310
SHOE FINISHING MACHINE
Filed June 8, 1938   3 Sheets-Sheet 2
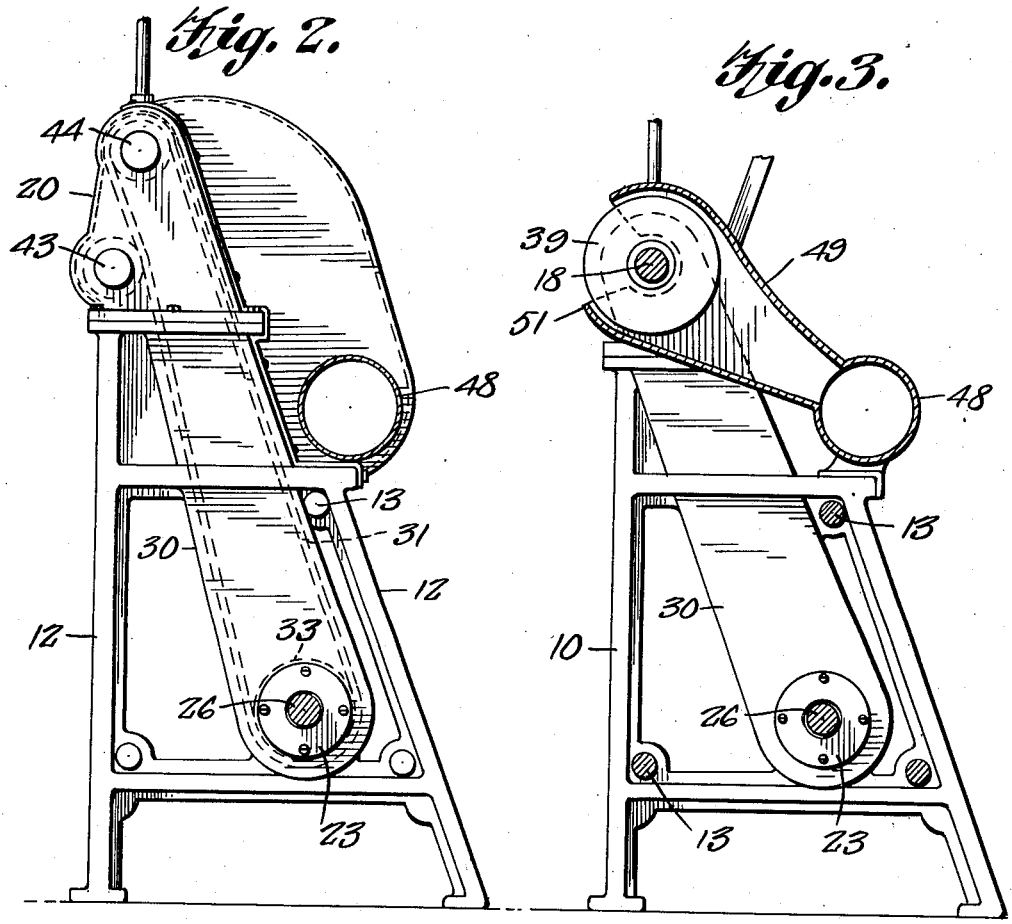
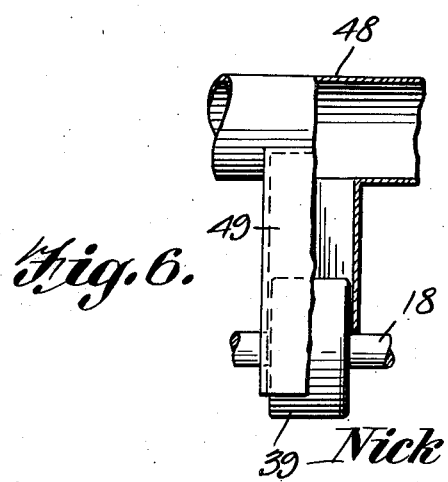

July 25, 1939.  N. ORGITANO  2,167,310
SHOE FINISHING MACHINE
Filed June 8, 1938  3 Sheets-Sheet 3
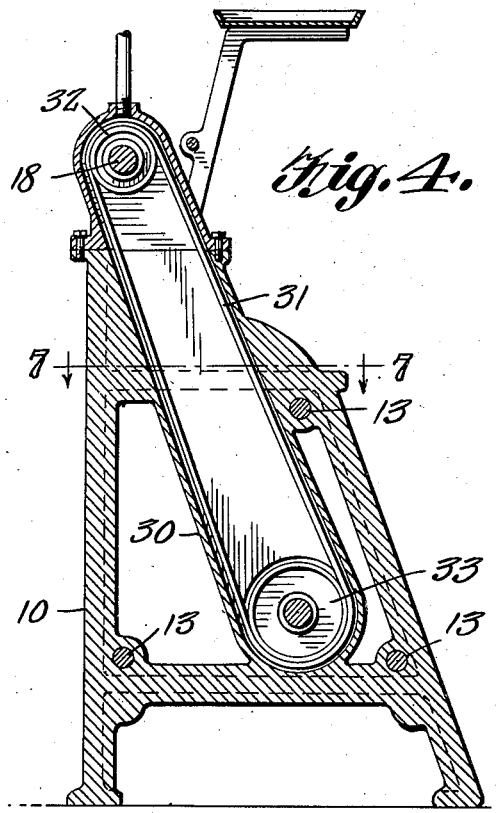
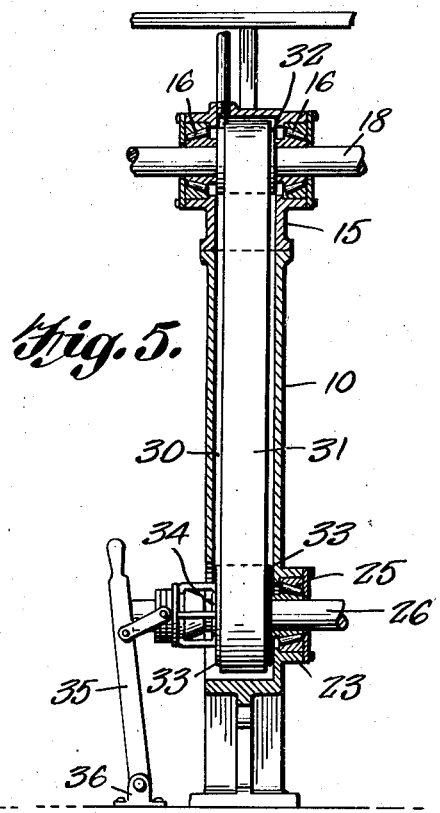
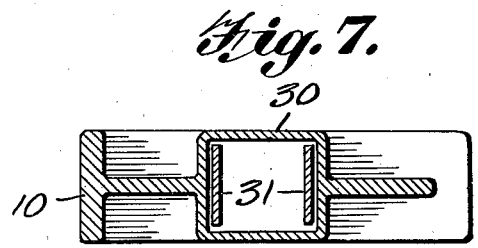
Nick Orgitano, INVENTOR
BY Victor J. Evans & Co.
ATTORNEYS Patented July 25, 1939

2,167,310

UNITED STATES PATENT OFFICE 2,167,310

SHOE FINISHING MACHINE

Nick Orgitano, Lebanon, Pa.

Application June 8, 1938, Serial No. 212,564

1 Claim. (Cl. 51—166)

The invention relates to shoe machinery and more especially to shoe finishing machines for use in repair shops or other shoe handling concerns.

The primary object of the invention is the provision of a machine of this character, wherein there is grouped a plurality of workable elements required in the finishing, repairing or otherwise handling of footwear and these elements are susceptible of operation selectively, being under the control of an attendant or operator of the machine and are handy for use as well as avoiding the necessity of the simultaneous driving of all elements in their aggroupment within the machine while associated with those elements which are productive of dirt, dust, trimmings and other scrapped materials have in association therewith a collector for such waste materials and in this way avoiding the scattering thereof when the machine is in operation.

Another object of the invention is the provision of a machine of this character, wherein the collector for waste is of a construction to avoid choking or accumulating the waste received thereby within the same and at the same time assuring against the delivery of such waste to the atmosphere or otherwise scattering thereof while the machine is in operation.

A further object of the invention is the provision of a machine of this character, wherein the driving connections thereof are enclosed and thus protecting an attendant or operator of the machine from coming in contact with the driving connections particularly those transferring power from a main drive to the workable elements of the machine as well as avoiding the settling of foreign matter upon such connections which necessarily would interfere with the working of the machine in its entirety.

A still further object of the invention is the provision of a machine of this character, wherein the setup of the same is novel and locating the workable elements in grouped relationship having the same handy for service and assuring finishing of work with dispatch and without excessive handling thereof or imposing undue labor on the part of an attendant or operator of the machine.

A still further object of the invention is the provision of a machine of this character, which is simple in its construction, thoroughly reliable and effective in operation, assuring the execution of work with ease and dispatch, the workable elements of such machine being readily accessible for service, strong, durable and inexpensive to manufacture and install.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 1 is an elevation of the machine constructed in accordance with the invention looking toward its front.

Figure 2 is a sectional view taken on the line 2—2 of Figure 1 looking in the direction of the arrows.

Figure 3 is a sectional view taken on the line 3—3 of Figure 1 looking in the direction of the arrows.

Figure 4 is a sectional view taken on the line 4—4 of Figure 1 looking in the direction of the arrows.

Figure 5 is a fragmentary vertical longitudinal sectional view through the machine showing in detail one driving connection thereof.

Figure 6 is a fragmentary top plan view partly in section.

Figure 7 is a sectional view taken on the line 7—7 of Figure 4 looking in the direction of the arrows.

Figure 8 is a detail vertical sectional view taken longitudinally of the machine through one of the bearings.

Figure 9 is an end elevation partly in section.

Similar reference characters indicate corresponding parts throughout the several views in the drawings.

Referring to the drawings in detail, the machine is denoted generally at A and includes a grouping stand having a plurality of vertical and properly spaced leg frames 10, 11 and 12, respectively, these being held in their spaced relation to each other by longitudinally directed horizontally arranged tie rods 13, being fastened in selected spaced relation to each other in any suitable manner to the said leg frames to assure rigid and firm union of these parts in the setup of the stand A for relieving vibration or unsteadiness thereto.

The leg frames 10 and 11 have bolted or otherwise fitted to their tops hollow heads 14 and 15, respectively, these being equipped with roller bearings 16 about rotatable shafts 17 and 18, respectively, being operable independently of each other. The leg frame 12 at its top has fixed thereto a hollow head 20, being equipped with roller bearings (not shown) for the shafts 21 and 22, respectively, which, together with the other shafts mentioned, are arranged horizontally. The shafts 17 and 18 in their horizontal position are disposed in longitudinal alignment with each other while the shafts 21 and 22 are disposed in their horizontal positions one above the other, the shaft 22 being the uppermost shaft.

The leg frames 10, 11 and 12 have formed therewith journaling hubs 23 and 24, respectively, each being equipped with roller bearings 25 about a main driving shaft 26 being disposed horizontally in a longitudinal direction of the stand A and below the said shafts 17, 18, 21 and 22, respectively. The shaft 26 has belt and pulley connections 27 and 28, respectively, with an electric power unit such as a motor 29 stationarily fitted within the stand A at the desired location.

The leg frames 10 and 12 have built therein belt housings 30, portions of these being created by the heads 14 and 20 companioned thereto for completely enclosing or enveloping driven belts 31 for the rotation of the shafts 17, 18, 21 and 22 independently of each other excepting the said shafts 21 and 22, these being rotated in unison with each other and are suitably geared together for this purpose. The belts 31 are trained over suitable pulleys 32 fixed to the said shafts 17, 18 and 21, while loose upon the shaft 26 are pulleys 33 and about which are trained the said belts 31. These pulleys 32 and 33 are confined within the heads 14 and 20 and the housings 30 as built in the leg frames 10 and 12.

Associated with each pulley 33 is a clutch 34 operated from a control lever 35 manually actuated for releasably fastening the pulley 33 to the shaft 26 so that power from the latter can be transferred selectively to the shafts 17 and 18, respectively, and also 21 and 22. The levers 35 are swingably fitted in foundation brackets 36 and are readily accessible to an operator or an attendant of the machine.

The shaft 17 has fixed thereto the workable elements 37, 38 and 38', respectively, being in the form of brushes although they may be of any other type. The shaft 18 has fixed thereto grinding and buffer elements 39, 40 and 41, respectively, while the shafts 21 and 22 carry cutters 42, 43 and 44, respectively, being for the purpose of cutting and trimming footwear materials. The elements and the cutters are serviceable for the finishing of footwear or for the repairing thereof.

Carried by the heads 14 and 15 are brackets 45 supporting a shelf or rack 46 for accommodating work. The shelf or rack 46 is rearmost of the stand A and is properly elevated with respect thereto to assure access by an attendant or operator of the machine.

The heads 14, 15 and 20, respectively, have built therewith electric light fixtures 47, these being disposed for proper lighting of the machine and the workable elements thereof.

Arranged within the stand A longitudinally thereof is a suction conveyor tube or pipe 48, being inclined in the direction of one end and has the variable intake throats 49 and 50, respectively, their inlet mouths 51 partially accommodating the elements 39, 40 and 41, respectively, on the shaft 18 so that waste, dust or other separated matter or materials will be drawn into the tube or pipe 48 for deposit or discharge at a convenient point removed from the machine, the suction within said pipe or tube 48 being had by a rotary suction device 52 driven through belt and pulley connections 53 and 54, respectively, from the shaft 26 and included with the pulley 54 loose upon the shaft 26 is a clutch 55 manually actuated by a lever 56 so that the device 52 can be stopped and started at will. This conveyor pipe or tube 48 relieves the atmosphere from becoming contaminated or permeated with the dirt, dust, waste or other substances thrown off by the working of the elements 39, 40 and 41, respectively, when in service for the finishing of footwear or the repairing thereof.

What is claimed is:

A machine of the character described comprising a stand having a leg provided with a recess longitudinally directed therein and opening through the top and laterally from one side of said leg, a capping piece closing the open top of said recess and superimposed upon the leg, driving and driven shafts journaled for passage through the recess at the lateral opening therein and the capping piece, side formations on the capping piece and having bearings encircling the shaft fitting said capping piece, belt pulleys on said shafts and accessible through the lateral opening of said recess and capping piece, respectively, an endless belt confined within the recess and trained over the said pulleys for effecting driving connection between the shafts and a clutch connection between the shaft passing through the leg recess and engaging the pulley next thereto.

NICK ORGITANO.